Nov. 19, 1940.　　　　H. G. WITTELS　　　2,222,098
PERCOLATOR
Filed May 12, 1939

Inventor:
HERBERT G. WITTELS
By Leo Idelson
Attorney.

Patented Nov. 19, 1940

2,222,098

UNITED STATES PATENT OFFICE 2,222,098

PERCOLATOR

Herbert G. Wittels, Brooklyn, N. Y.

Application May 12, 1939, Serial No. 273,199

4 Claims. (Cl. 53—3)

This invention relates to percolators for making infusions of coffee, tea and other such brews and it has for its principal object the provision of a novel cooking vessel of the percolator type in which the coffee grounds or the like are infused with freshly boiled clear water in such manner that the coffee or other such infused brew is maintained in an independent compartment separate from the supply of clear boiling water. By means of this construction of percolator a given quantity of boiling water may be percolated through a given quantity of the coffee grounds or the like to insure the preparation of a quantity of coffee of the desired strength and aroma, the construction of the percolator being such that when the supply of boiling water is completely percolated through the coffee grounds the water supply is exhausted, there is no further infusion of the coffee grounds and the coffee brew is then completed and ready for use.

It is a further object of the present invention to provide a percolator wherein a whistle or other audible means is provided for indicating the instant when the supply of boiling water is completely percolated through the coffee grounds, thereby indicating the completion of the coffee brew.

A still further object of the invention is to provide a coffee pot of the percolator type which will be durable and efficient in use, that is, simple and economical to manufacture, and that is easily disassembled for cleaning purposes.

Other objects and advantages of the invention will appear more fully hereinafter, it being understood that the invention consists substantially in the combination, construction, location and relative arrangement of parts, all as will be described more fully hereinafter, as shown in the accompanying drawing and as finally pointed out in the appended claims.

Figure 1:
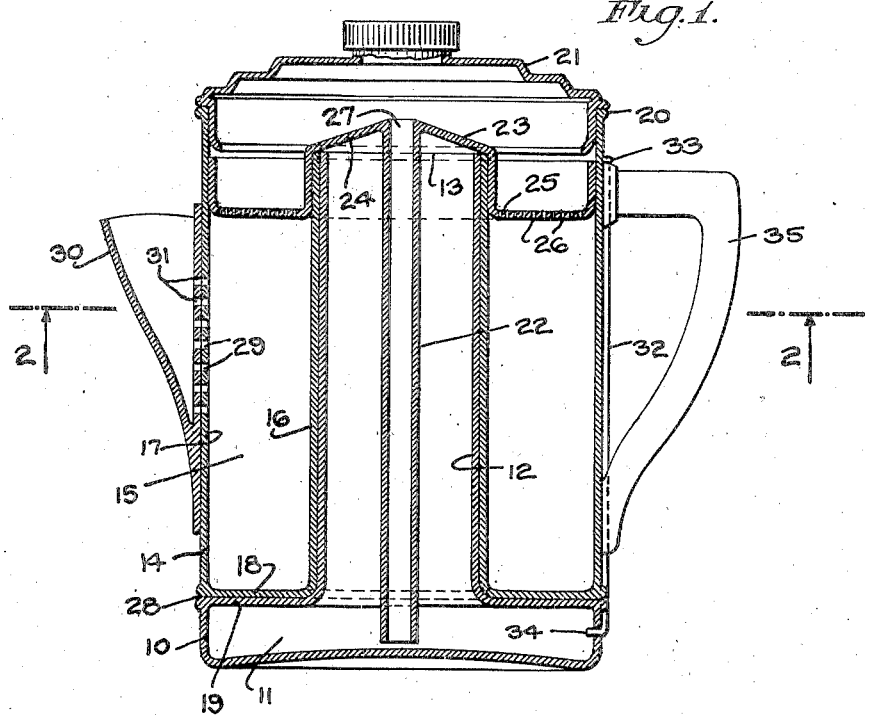
Figure 2:
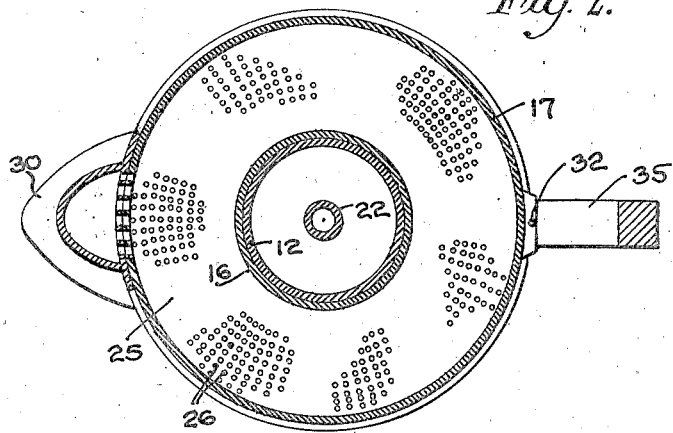

In the accompanying drawing, which are illustrative of a preferred embodiment of the present invention:

Figure 1 is a vertical sectional view of a percolator constructed in accordance with and embodying the principles of the present invention; and Figure 2 is a horizontal sectional view taken on the line 2—2 of Figure 1.

Referring now more particularly to the drawing, it will be observed that the percolator of the present invention includes a water containing vessel 10 the bottom of which is in the form of a circular body 11 which is adapted to receive water to be boiled and at the same time serve as the supporting base for the percolator unit. Extending upwardly from the circular body 11 is a tubular extension 12 of substantial diameter, the upper end 13 of this extension 12 being open. The tubular extension 12 and the lower circular body 11 together form a vessel which is adapted to receive the water to be boiled.

Fitted over the vertically extending tubular member 12 of the water receiving compartment is a second vessel 14 providing an annular chamber 15 within which is adapted to be received the infused liquid such as the brewed coffee, tea or the like. As appears most clearly in Figure 1, the vessel 14 is provided with a pair of concentric inner and outer walls 16 and 17 which are joined together at their lower extremities by a bottom wall 18, the latter being adapted to rest upon the upper surface of the wall 19 of the vessel 10 while the inner wall 16 of the outer vessel snugly embraces the tubular extension 12 of the vessel 10. Thus, when the vessels 10 and 14 are fitted together as shown in Figure 1 a pair of separate compartments 11 and 15 are provided. Preferably, the outer wall 17 of the compartment 15 which constitutes the outer wall of the percolator extends to a height somewhat above the upper ends of the telescoped inner tubular walls 12 and 16 and so provides an upper edge 20 for the percolator which is adapted to receive a suitable lid or top 21.

Disposed within the percolator and fitted over the upper extremities of the telescoped inner tubular walls 12 and 16 is a percolator tube unit designated generally by the reference numeral 22. This percolator tube unit is provided with an elongated percolating tube which is adapted to be disposed centrally within the tubular extension 12 of the water receiving compartment 11, this tube 22 being provided at its upper extremity with an integrally formed radially extending flange 23 of the configuration shown in Figure 1. As clearly appears in this figure, the portion of the flange 23 which immediately surrounds the upper extremity of the percolating tube 22 is downwardly inclined, as at 24, and terminates in an annular channel-shaped section 25, the base of which latter is perforated, as at 26. This channel-shaped section 25 snugly fits into the top of the annular chamber 15 and serves as a receptacle for the coffee grounds or the like of which the brew is to be made and through which the boiling liquid is to be percolated. It will be noted that the percolating tube 22 is so disposed within the percolator that the lower extremity thereof terminates just short of the bottom wall of the water receptacle 11, the arrangement being such that when the water in the compartment 11 commences to boil, it rises in the tube 22 until it passes out of the upper open end 27 thereof. The boiling water thus discharged through the said upper end 27 of the said percolating tube 22 then flows downwardly over the upper surface of the inclined portion 24 of the percolating tube unit and thence into the annular channel-shaped section 25 where it percolates through the coffee grounds contained therein and eventually passes by way of the perforations 26 into the compartment 15.

It will be observed that the outer cylindrical walls of the compartments 11 and 15 are disposed in a common cylindrical plane and it will be understood also that the parts 10 and 14 may be secured together in the nested relation shown in any suitable manner. For example, their fit may be so snug that they are frictionally held together or they may be braced or soldered, as at 28, along the joint extending circumferentially about the percolator. As clearly appears in the figure, the outer wall 17 of the compartment 15 is perforated, as at 29, over a limited area to provide for the discharge of the infused brew contained in said compartment. A suitable spout 30 may be secured in any suitable manner upon the outer surface of the said wall 17 and in embracing relation to the perforations 29 therein, the inner wall of this spout being also provided with perforations 31 which respectively register with the perforations 29.

Secured to the percolator externally thereof and in any desired suitable manner is a vertically extending whistle tube 32 the upper end of which is fitted with a conventional whistle 33 of the type well-known in the art. The lower end of the tube 32 is in communication with the interior of the lower part of the compartment 11, as at 34, the inlet to the tube 32 being disposed at an elevation slightly above the lower open end of the percolator tube 22. It will be apparent that so long as the water in the compartment 11 remains at a level above the inlet to the tube 34, the whistle 33 remains inoperative. However, when the water level in the compartment 11 drops below the inlet to the whistle tube 32 the steam formed in the compartment 11 by the boiling water therein is free to pass into the tube 32 and upon emerging from the upper end thereof causes the whistle 33 to blow and so audibly signals the fact that the requisite amount of boiling water to form the infused liquid, such as coffee, has been percolated through the coffee grounds contained in the compartment 25 and has passed into the compartment 15 in a form ready for immediate use. Thus, by means of the percolator constructed in accordance with and embodying the principles of the present invention by properly proportioning the amount of coffee grounds disposed in the compartment 25 and the amount of boiling water contained in the compartment 11 a single charge of clear water is all that is necessary to insure the production of coffee of consistently uniform strength and aroma. By so avoiding the usual practice of recirculating the boiling water through the coffee grounds the tendency to carry into the infused liquid fine undissolved particles of the coffee grounds is eliminated, the result being to provide a final liquid preparation which not only has the desired strength and aroma but is also clear of undissolved coffee grounds. To facilitate pouring the infused liquid from the compartment 15, the percolator may be provided with a suitable handle, such as 35.

What is claimed as new and useful is:

1. In a percolator, in combination, a water-receiving receptacle having a relatively shallow compartment in the base thereof and an open-ended tubular extension rising above and in communication with said compartment, a second receptacle fitted about said tubular extension and resting upon said base compartment, said second receptacle forming an annular chamber for reception of the brewed liquid, and an annular perforated receptacle for the material to be brewed snugly fitted within the upper end of said annular chamber, said receptacle including a centrally apertured dome-shaped part extending across and closing the upper end of said tubular extension and including also a tube projecting downwardly from said central aperture in said dome-shaped part for effecting transference of the heated water in said compartment to and through the infusing material and into said annular chamber, the said heated water being adapted to arise vertically in said tube to and upon the upper surface of said dome-shaped part from which latter said water flows readily into said receptacle.

2. In a percolator, in combination, a pair of concentric liquid-receiving compartments, the lower end of the inner compartment being radially enlarged to provide a shallow compartment underlying and forming a base for said concentric compartments, an annular receptacle having a perforated bottom and a pair of radially spaced inner and outer walls nested within the upper end of the outer concentric compartment, said receptacle including a central dome-shaped part supported upon the upper edge of the inner wall of said receptacle and adapted to overlie and close the top of the inner concentric compartment, and a percolating tube secured to and depending from said dome-shaped part of the annular receptacle, said tube being open at top and bottom thereof and being of a length such that its bottom end is disposed just above the bottom wall of said shallow base compartment.

3. In a percolator of the character defined in claim 2 wherein said dome-shaped part is upwardly dished to provide an upper surface over which heated water discharged from the upper end of said tube flows by gravity into said annular receptacle.

4. A percolator as defined in claim 2 wherein means are provided operative automatically to produce an audible signal when the liquid level in said base compartment drops to a predetermined level, said signaling means consisting of a whistle tube one end of which is in communication with the interior of said base compartment at a point close to the bottom thereof and the other end of which is equipped with a whistle adapted to be actuated by steam emanating from said compartment and passing through said whistle tube.

HERBERT G. WITTELS.